US005486937A

United States Patent [19]
Yano et al.

[11] Patent Number: 5,486,937
[45] Date of Patent: Jan. 23, 1996

[54] LATEX CONTAINMENT MEANS FOR A LIQUID CRYSTAL WINDOW

[75] Inventors: Yuichi Yano, Itami; Naoki Kinugasa; Akio Takigawa, both of Nishinomiya, all of Japan

[73] Assignee: Nippon Sheet Glass Co., Ltd., Osaka, Japan

[21] Appl. No.: 262,345

[22] Filed: Jun. 20, 1994

Related U.S. Application Data

[63] Continuation-in-part of Ser. No. 958,298, Oct. 8, 1992, abandoned.

[30] Foreign Application Priority Data

Oct. 18, 1991 [JP] Japan .................... 3-270934

[51] Int. Cl.$^6$ ........................................ G02F 1/13
[52] U.S. Cl. ............................. 359/51; 359/52
[58] Field of Search ......................... 359/51, 52

[56] References Cited

U.S. PATENT DOCUMENTS

| | | | |
|---|---|---|---|
| 4,435,047 | 3/1984 | Ferguson | 350/334 |
| 4,446,916 | 5/1984 | Hayes | 165/185 |
| 4,673,255 | 6/1987 | West et al. | 359/51 |
| 4,688,900 | 8/1987 | Doane et al. | 350/347 |
| 4,992,201 | 2/1991 | Pearlman | 252/299.1 |
| 5,197,242 | 3/1993 | Baughman et al. | 359/51 |
| 5,206,747 | 4/1993 | Wiley et al. | 359/51 |
| 5,331,446 | 7/1994 | Hirai et al. | 359/51 |

Primary Examiner—William L. Sikes
Assistant Examiner—Ron Trice
Attorney, Agent, or Firm—Woodcock Washburn Kurtz Mackiewicz & Norris

[57] ABSTRACT

Disclosed is a liquid crystal device comprising a pair of transparent substrates, transparent conductive films respectively disposed on the inner surfaces of the transparent substrates, and containment means containing a liquid crystal material in gaps interposed between the transparent conductive films, wherein an average refractive index ($n_a$) of the liquid crystal material, a refractive index ($n_b$) of the containment means, a total surface quantity (S) [μm$^{-1}$] of the gaps, and a distance (t) [μm] between the transparent conductive films satisfy the following equation, $$|n_a - n_b| \times S \times t \geq 4.2.$$

14 Claims, 1 Drawing Sheet

LATEX CONTAINMENT MEANS FOR A LIQUID CRYSTAL WINDOW

This is a continuation-in-part of application Ser. No. 07/958,298, filed Oct. 8, 1992, now abandoned.

BACKGROUND OF THE INVENTION

1. Field of the Invention

The present invention relates to a liquid crystal device comprising liquid crystal material, and more particularly to a liquid crystal device made by disposing transparent conductive films on the inner side surfaces of a pair of transparent substrates, respectively, and interposing containment means for containing the liquid crystal material in gaps between the transparent conductive films, thereby imparting a superior light modulating function to the liquid crystal device.

2. Description of the Prior Art

In an architectural or automotive application, the inflow of a solar radiation energy through a window exerts a large effect on a load of the air conditioning in the interior. Accordingly, in the viewpoint of energy saving, it becomes important to provide a light modulating function to the window.

As the light modulation range desired in practical use, it is necessary to select the optical characteristics at least in a range between the transparent glass used at present as a window glass and a heat absorbing glass for absorbing the solar radiation energy. The light modulation range is, preferably, within a range of 15% or more in terms of variable volume of the solar radiation energy transmittance (hereinafter, referred to as ("$\Delta T$").

Conventionally, as a device having such light modulating function, there has been known an electrochromic device (hereinafter, referred to as "ECD"). The ECD functions to control the visibility and the transmitted light quantity of the solar radiation energy absorption of the light with the use of a material variable in the optical spectrum due to electrochemical oxidation-reduction reaction, such as tungsten oxide and prussian blue.

However, since the ECD is of current drive type, when being enlarged in area, it is remarkably reduced in a response time due to a large voltage drop and is inevitably degraded, for example, due to the electrochemical change of the elementary material in operating for a long period. Therefore, there has been not realized a large area device having a sufficient durability in practical use.

To solve the above problem, in place of the ECD of the above current drive type, there has been proposed a light modulating device of voltage drive type. Japanese Patent Laid-open No. sho 58-501631 corresponding to U.S. Pat. No. 4,435,047 discloses a nematic curvilinear aligned phase (hereinafter, referred to as "NCAP") liquid crystal device having a light modulating function being excellent in durability and easy in enlarging the area. Also, Japanese Patent Laid-open No. sho 60-502128 (U.S. Pat. No. 4,688,900) discloses a liquid crystal device obtained by a phase of separation method. These devices act on the basis of the following principle.

The liquid crystal device including tiny droplets of a liquid crystal material dispersed in a cheap polymer matrix looks milky white without applying voltage. This is because liquid crystals are aligned along with the curvilinear surface of a polymer wall, which distorts a light path or causes reflection and scattering of the light at each interface between the polymer matrix and the liquid crystals.

Meanwhile, in applying a voltage, the liquid crystals in the droplets are aligned parallel to direction of the electric field. In this case, by closing an ordinary refractive index of liquid crystals $n_o$ to be equal to a refractive index of polymer matrix $n_p$, the incident light normal to the surface of a liquid crystal device passes through the interface of the polymer matrix and each liquid crystal without any reflection, thus making the liquid crystal device transparent.

The above liquid crystal device can control the visibility; however, since the incident light to the liquid crystal device is almost scattered on the opposed side (hereinafter, referred to as "forward") to the incident side in case of applying no voltage, the transmitted light quantity of the solar radiation energy is little reduced as compared with the case of applying voltage, thus obtaining only several % of $\Delta T$.

To solve the above problem, there has been proposed such a technique as disclosed in Japanese Patent laid-open sho 58-501631 (U.S. Pat. No. 4,435,047), wherein the absorption of the light in applying no voltage is increased by adding a pleochroic dye in a liquid crystal material used in the above liquid crystal device. Such a device has a large $\Delta T$; however, it cannot be used in the architectural or automotive application exposed in the solar radiation for a long period because the pleochroic dye is essentially easy to be degraded against the light and heat.

OBJECTS AND SUMMARY OF THE INVENTION

To solve the above problem, the present invention has been made, and the object is to provide a liquid crystal device being excellent in durability and easy in enlarging the area, and also having a light modulating function of $\Delta T$ being 15% or more.

In a preferred mode of the present invention, there is provided a liquid crystal device having a structure of interposing a containment means containing the liquid crystal material in gaps between substrates provided with a pair of transparent conductive films, wherein a difference between an extraordinary index ($n_e$) and an ordinary index ($n_o$) of said liquid crystal material is less than 0.23, and an average refractive index of the above liquid crystal material $n_a$, a refractive index of the containment means $n_p$, a total quantity of a surface area of the above gaps per a unit volume $S[\mu m^{-1}]$ (hereinafter, referred to as "total surface area $S$") and the thickness between a pair of transparent conductive films $t[\mu m]$ (hereinafter, referred to as "thickness") satisfy the following equation (1).

The liquid crystal material is held in gaps within containment means, and whether the gaps exist independently or integrally partially or wholly, the equation (1) is effective. Hereinafter, the above gap is called a "capsule" for convenience.

$$|n_a - n_p| \times S \times t \geq 4.2 \tag{1}$$

Incidentally, the average refractive index $n_a$ of the above liquid crystal material is generally represented as the following equation (2).

$$n_a = (2 \times n_o + n_e)/3 \tag{2}$$

wherein $n_o$ is an ordinary index of the liquid crystal material, and $n_e$ is an extraordinary thereof.

FIG. 1 is a typical view of a liquid crystal device according to the present invention. In this figure, numeral 1 indicates a substrate, 2 is a transparent conductive film, 3 is a liquid crystal material and 4 is a containment means. Also, the total surface area S is theoretically represented as the following equation (3) using parameters V and D.

$$S = 6 \times V/D \qquad (3)$$

wherein, V indicates a volume ratio of a liquid crystal material to the total volume of the liquid crystal material and medium (hereinafter, referred to as "liquid crystal ratio"), and D is an average diameter of a capsule (hereinafter, referred to as "capsule diameter"). In this case, even if some capsules are combined, they may be regarded as the independent capsules. Accordingly, the above value D indicates the average diameter of a true spherical body having the same volume as that of the independent capsule.

The present inventors have examined a relationship between the parameters of the liquid crystal device and ΔT, and consequently, have obtained the following equation (4). Namely, by suitable combination of a plurality of the parameters, it is possible to mostly scatter the incident light liable to be scattered forward on the incident side (hereinafter referred to as "backward"), and hence to reduce the transmitted light quantity in applying no voltage thereby significantly enhancing the light modulating function.

$$\Delta T = 3.57 \times |n_a - n_b| \times S \times t \qquad (4)$$

When the total surface area S is constant, by enlarging the difference between the extraordinary refractive index $n_e$ and the ordinary index $n_o$ of the liquid crystal material, that is, a birefringence $\Delta n = (n_e - n_o)$, the average refractive index $n_a$ is enlarged thus increasing the ΔT.

In accordance with increase of ΔT, a transmission T only decreases in applying voltage, while an angle of visibility becomes narrow. Particularly, the more the viewing angle varies from perpendicular, the opaque amount becomes larger and thereby considerably impairs the quality in outward appearance of the liquid crystal device. In particular, where a liquid crystal device having a large area is used, the angle in which an observer looks at a central portion is widely different from that in which an observer looks at a neighboring portion. Accordingly, the angle of visibility is an important property of the device. While the angle of visibility is enlarged in decreasing Δn, ΔT decreases. Therefore, in order to obtain a sufficient angle of visibility in increasing ΔT, Δn is preferably less than 0.23.

Also, when Δn is constant, by enlarging the total surface area S or thickening the thickness between a pair of transparent conductive films t, the ΔT is increased. To enlarge the total surface area S, the capsule diameter D is reduced or the liquid crystal ratio V is increased.

To obtain the higher ΔT more than 15%, the parameters of the liquid crystal device may be comprising the right side of the above equation (4) for setting 15% or more, that is, to satisfy the equation (1).

Further, to satisfy the equation (1), the parameters of the liquid crystal device are preferably within the following range.

The capsule diameter exerts a large effect on the light scattering entered to the liquid crystal device. When the capsule diameter is less than 0.5 μm, the transmittance on the long wavelength side in a visible light region is increased, so that the ability of shielding the visibility in applying no voltage. Also, when the capsule diameter exceeds 3 μm, the total surface area S is reduced thus increasing the transmitted light quantity. Accordingly, the capsule diameter is preferably within the range from 0.5 to 3 μm, and more preferably, from 0.8 to 2 μm.

Meanwhile, when capsule diameter is constant, the total surface area S is enlarged with increase in the liquid crystal ratio. Accordingly, since the light quantity of the backscattering is increased, the transmitted light can be widely controlled. However, when the liquid crystal ratio becomes much bigger (1.0 at maximum), it is difficult to form the gap of the containment means for holding the liquid crystal material, which reduces the scattering degree of the incident light thereby decreasing to control the transmitted light. Also, when the liquid crystal ratio is less than 0.5, it is difficult to make the transmittance ΔT not less than 15%, even if the birefringence Δn is made larger. Consequently, the liquid crystal ratio is preferably within the range from 0.5 5o 0.9.

When the thickness between the substrates provided with the transparent conductive films is narrow the quantities of the capsules and the liquid crystal material held therein are reduced thus reducing the total surface area S of the capsules. Accordingly, the transmittance can be hardly controlled widely (the transmittance of solar radiation energy). When the thickness between a pair of transparent conductive films is less than 10 μm, it is difficult to keep the transmittance ΔT 15% or more even if the birefringence Δn is enlarged. Meanwhile, as the thickness is lengthened, the controlled transmittance is increased; however, in proportion to increase in the thickness, the higher voltage is required, and therefore, the thicker thickness is undesirable. In practical use, the thickness between a pair of transparent conductive films is required to be 40 μm or less. Accordingly, the distance between a pair of transparent conductive films is preferably within the range from 10 to 40 μm.

The liquid crystal material used in the present invention is not particularly limited but may include a nematic liquid crystal, cholesteric liquid crystal and smectic liquid crystal. Particularly, the nematic liquid crystal is preferable. This is because, in applying no voltage, the distortion of the crystal structure of the nematic liquid crystal is due to alignment at the boundary between polymer matrix and the liquid crystals, differently from the extremely strong twisting for the cholesteric liquid crystal and the bulk effect of a lamellar structure for the smectic liquid crystal.

Also, the containment means for containing the above liquid crystal material to enlarge the ΔT without harming the visibility may be selected form the inorganic materials and organic materials having the refractive index $n_b$ in conformity with the ordinary index $n_o$ or the extraordinary index $n_e$ of the liquid crystal material and holding the liquid crystal material in the gaps. Particularly, polymer as being easy in adjustment of the refractive index and enlarging the area of the device is preferable. For example, such a latex as disclosed in Japanese Paten Laid-open No. sho 60-252687 is preferable to obtain the device being excellent in adhesiveness to the substrate, optical homogeneity and physical durability.

To prepare the means containing the above liquid crystal material, some surfactant may be added. Preferably, the added amount of the surfactant is limited to the minimum amount required for stabilizing the droplet size of the liquid crystal in an emulsion.

Further, to prepare the means containing the above liquid crystal material, a cross-linking agent may be added. By addition of the above crisis-linking agent, it is possible to obtain the liquid crystal device having the improved adhesiveness between the means and the transparent conductive film formed on the surface of the substrate, and also the moisture-proof.

As the substrate provided with the transparent conductive film used in the present invention, there can be used a common glass substrate having an indium-tin oxide (hereinafter, referred to as "ITO") film or tin oxide (hereinafter, referred to as "$SnO_2$") film on the surface, and also other materials excellent in light transmittance, for example, a plastic substrate or a flexible plastic film.

According to the present invention, there can be obtained a liquid crystal device having such a light modulating function of $\Delta T$ being 15% or more by suitably combining the parameters of the liquid crystal device, such as, the average refractive index $n_a$ of the liquid crystal material, the refractive index $n_b$ of the means for holding the liquid crystal material, the thickness t, the liquid crystal ratio V, and the capsule diameter D so as to satisfy the following equation (5) obtained on referring to the equation (1) and (3).

$$|n_a-n_b| \times (6 \times V/D) \times T \geq 4.2 \qquad (5)$$

The function mentioned above can be realized by increasing the ratio of the backscattering of the incident light in applying no-voltage. Differently from the incident conventional light modulating device, by scattering the light backward without absorbing it, in other words, by reflecting the incident light, the light modulating function is improved. Accordingly, the material constituting the liquid crystal device is prevented from being degraded by the light and the heat accompanied with the absorption thereof, thus obtaining the excellent durability.

The liquid crystal device of the present invention is able to sufficiently adjust the transmittance.

DETAILED DESCRIPTION OF THE PREFERRED EMBODIMENTS

Figure 1:
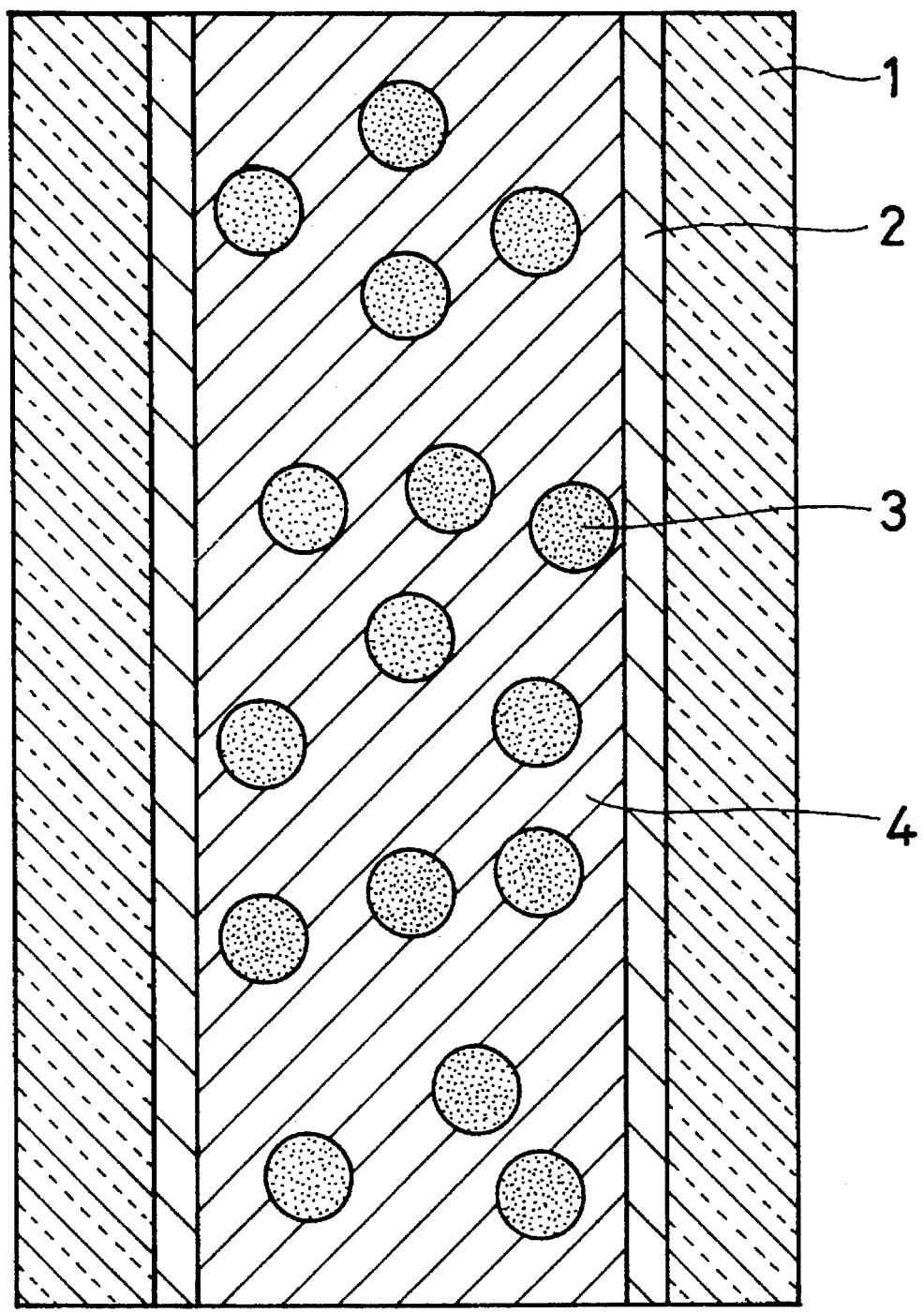
FIG. 1 is a typical cross-sectional view of a liquid crystal device fabricated according to the present invention.

The present invention will be described by way of embodiments, but is not limited to the embodiments.

For example, a liquid crystal device of the present invention is fabricated in the following manner.

At first, an emulsion as a medium is prepared by directly mixing a liquid crystal material with a water based latex. The emulsion may be prepared by mixing the liquid crystal material with a water phase, and mixed with the latex. In preparation of the emulsion, some surfactant is added to stabilize the droplets size of the liquid crystal material. Also, the mixture is executed with the use of various types of mixers such as a blender or colloid mill. Secondly, the emulsion is added with cross-linking agent, which are slowly stirred.

After that, the emulsion dispersed the liquid crystal material is coated on a transparent conductive film of a substrate, which is previously formed with the transparent conductive film, to a required thickness by a knife blade or other means, and is dried. At least, the liquid crystal device is obtained by lamination of another substrate provided with a transparent conductive films, side being positioned on the inner side, on the above dried material.

(Working Example 1)

A liquid crystal device of the present invention was fabricated in the following manner. The nematic liquid crystal E49 sold by BDH (average refractive index $n_a=1.610$) was added with the surfactant IGEPAL CO-610 sold by GAF in an amount of 0.5 wt %, which were added into the water based latex Neorez R-967 sold by ICI Resin Corp. (old name: Polyvinyl Chemical Corp.) containing the latex particles in an amount of 40 wt % so as to obtain a liquid crystal ratio of 0.62. The mixture was then homogenized at 7000 r.p.m. for 10 min. using a homogenizer to thus obtain an emulsion. Next, the emulsion was added with the cross-linking agent CX-100 sold by ICI Resin Corp. (old name: Polyvinyl Chemical Corp.) in an amount of 3 wt % to the weight of R-967 while being slowly mixed. In addition, the refractive index of the containment means is as follows: $N_b=1.495$.

This mixture was coated on ITO film of a polyethylene terephthalate (hereinafter, referred to as "PET"). The thickness of the coating material after drying was approximately 30 μm. After drying of the coating material, the PET film was laminated with another PET film provided with the ITO film in such a manner that the ITO film side is brought in contact with the above dried material, to thus obtain a liquid crystal device.

The parameters of the liquid crystal device thus obtained are shown in Table 1. With the use of the parameters, the equation of $|n_a-n_b| \times S \times t$ is calculated, which gives the results of the value of 4.3.

TABLE 1

| | Δn | Capsule diameter (μm) | Liquid crystal ratio | Thickness (μm) |
|---|---|---|---|---|
| Working Example 1 | 0.251 | 3.0 | 0.62 | 30 |
| Working Example 2 | 0.143 | 1.0 | 0.62 | 20 |
| Working Example 3 | 0.025 | 2.0 | 0.75 | 20 |
| Working Example 4 | 0.143 | 2.0 | 0.62 | 40 |
| Comparative Example 1 | 0.143 | 3.0 | 0.62 | 20 |

(Working Example 2)

There was prepared a liquid crystal device having a construction obtained by combining parameters differently from those in Working Example 1.

The nematic liquid crystal ZLI-1840 sold by Merck Japan LTD. (average refractive index $n_a=1.543$) was added with the surfactant IGEPAL CO-610 sold by GAF in an amount of 0.5 wt %, which were added into the water based latex Neorez R-967 sold by ICI Resin Corp. (old name: Polyvinyl Chemical Corp.) containing the latex particles in an amount of 40 wt % so as to obtain a liquid crystal ratio of 0.62. The mixture was then homogenized at 18000 r.p.m. for 10 min. using the homogenizer to thus obtain an emulsion. Next, the emulsion was added with the cross-linking agent CX-100 sold by ICI Resin Corp. (old name: Polyvinyl Chemical Corp.) in an amount of 3 wt % to the weight of R-967 while being slowly mixed. In addition, the refractive index of the containment means is as follows: $N_b=1.484$.

This mixture was coated on an ITO film of a PET previously formed with the ITO film using a doctor blade and was then dried. The thickness of the coating material after drying was approximately 20 μm. After drying of the coating material, the PET film was laminated with another PET film provided with the ITO film in such a manner that the ITO film side is brought in contact with the above dried material, to thus obtain a liquid crystal device.

The parameters of the liquid crystal device thus obtained are shown in Table 1 similarly to Example 1. With the use of the parameters, the equation of $|n_a-n_b| \times S \times t$ is calculated, which gives the results of the value of 4.4.

(Working Example 3)

There was prepared a liquid crystal device having a construction obtained by combining parameters differently from those in Working Examples 1 and 2.

The nematic liquid crystal ZLI-3219 sold by Merck JAPAN LTD was added with the surfactant IGEPAL CO-610 sold by GAF in an amount of 1 wt %, which were added into water based latex Neorez R-967 sold by ICI Resin Corp. (old name: Polyvinyl Chemical Corp.) containing the latex particles in an amount of 40 wt % so as to obtain a liquid crystal ratio of 0.75. The mixture was then homogenized at 14000 r.p.m. for 10 min. using the homogenizer to thus obtain an emulsion. Next, the emulsion was added with the cross-linking agent CX-100 sold by ICI Resin Corp. (old name: Polyvinyl. Chemical Corp.) in an amount of 3 wt % to the weight of R-967 while being slowly mixed. This mixture was coated on an ITO film of a PET previously formed with the ITO film using a doctor blade and was then dried. The thickness of the coating material after drying was approximately 20 μm. After drying of the coating material, the PET film was laminated with another PET film provided with the ITO film in such a manner that the ITO film side is brought in contact with the above dried material, to thus obtain a liquid crystal device.

The parameters of the liquid crystal device thus obtained are shown in Table 1. With the use of the parameters, the equation of $|n_a-n_b| \times S \times t$ is calculated, which gives the results of the value of 4.4.

(Working Example 4)

There was prepared a liquid crystal device having a construction obtained by combining parameters differently from those in Working Examples 1, 2 and 3.

The nematic liquid crystal ZL1-1840 sold by Merck Japan LTD. was added with the surfactant IGEPAL CO-610 sold by GAF in an amount of 0.5 wt %, which were added into water based latex Neorez R-967 sold by ICI Resin Corp. (old name: Polyvinyl Chemical Corp.) containing the latex particles in an amount of 40 wt % so as to obtain a liquid crystal ratio of 0.62. The mixture was then homogenized at 14000 r.p.m. for 10 min. using the homogenizer to thus obtain an emulsion. Next, the emulsion was added with the cross-linking agent CX-100 sold by ICI Resin Corp. (old name: Polyvinyl Chemical Corp.) in an amount of 3 wt % to the weight of R-967 while being slowly mixed. This mixture was coated on an ITO film of a PET previously formed with the ITO film using a doctor blade and was then dried. The thickness of the coating material after drying was approximately 40 μm. After drying of the material, the PET film was laminated with another PET film provided with the ITO film such that the ITO film side is brought into contact with the above dried material, to thus obtain a liquid crystal device.

The parameters of the liquid crystal device thus obtained are shown in Table 1 similarly to Example 1. With the use of the parameters, the equation of $|n_a-n_b| \times S \times t$ is calculated, which gives the results of the value of 4.4.

(Comparative Example 1)

As compared with the liquid crystal device of the present invention, there was prepared a liquid crystal device having a construction obtained by suitable combining the parameters disclosed in Japanese Patent Laid-open No. sho 60-252687 corresponding to U.S. Pat. No. 4,992,201.

The nematic liquid crystal ZLI-1840 sold by Merck Japan LTD. was added with the surfactant IGEPAL CO-610 sold by GAF in an amount of 0.5 wt %, which were added into water based latex Neorez R-967 sold by ICI Resin Corp. (old name: Polyvinyl Chemical Corp.) containing the latex particles in an amount of 40 wt % so as to obtain a liquid crystal ratio of 0.62. The mixture was then homogenized in 7000 r.p.m. for 10 min. using the homogenizer to thus obtain an emulsion. Next, the emulsion was added with the cross-linking agent CX-100 sold by ICI Resin Corp. (old name: Polyvinyl Chemical Corp.) in amount of 3 wt % to the weight of R-967 while being slowly mixed. This mixture was coated on an ITO film of a PET previously formed with the ITO film using a doctor blade and was then dried. The thickness of the coating material after drying was approximately 20 μm. After drying of the material, it was laminated with another PET film provided with the ITO film such that the ITO film side is brought in contact with the above dried material, to thus obtain a liquid crystal device.

The parameters of the liquid crystal device thus obtained are shown in Table 1 similarly to Example 1. With the use of the parameters, the equation of $|n_a-n_b| \times S \times t$ is calculated, which gives the results of the value of 1.5.

(Working Examples 1 to 4 and Comparative Example 1)

Each of the liquid crystal devices obtained by Working Examples 1 to 4 and Comparative Example was measured for a solar energy transmission in the case of applying no voltage (in the off state) and of applying voltage (in the on state) according to JIS R 3106, and each ΔT was calculated on the basis of the measured value. The results are shown in Table 2. In addition, as mentioned above, the ΔT is variable volume of the solar radiation energy transmittance, and more particularly, represents a difference between the solar energy transmittance between in the off state and the on state.

TABLE 2

| | $|n_a - n_b| \times S \times t$ | ΔT (%) |
| --- | --- | --- |
| Working Example 1 | 4.3 | 15.4 |
| Working Example 2 | 4.4 | 15.8 |
| Working Example 3 | 4.4 | 15.8 |
| Working Example 4 | 4.4 | 15.8 |
| Comparative Example 1 | 1.5 | 5.6 |

From Table 2, it becomes clear that, according to each Example of the present invention wherein the product of $|n_a-n_b|$ and $(S \times t)$ constituting the parameters of the liquid crystal device is 4.2 or more, the capsule diameter is within the range of 0.5–3 μm, the liquid crystal ratio is within the range of 0.5–0.9, and the thickness is within the range of 10–40 μm, there can be obtained the liquid crystal device having such a light modulating function of ΔT being 15% or more.

The angle of visibility of the liquid crystal device is wide and sufficient in the Working Examples 2 to 4, wherein a liquid crystal material less than 0.23 is employed, while the angle of visibility is narrow and insufficient in the Working Example 1, wherein a liquid crystal material more than 0.23 is employed.

Also, the liquid crystal device of the present invention can sufficiently control the visibility As is apparent from the Examples, by the suitable combination of the parameters constituting the liquid crystal device, it is possible to enhance the light modulating function of the solar energy transmittance as compared with the liquid crystal device obtained by the conventional manner.

What is claimed is:

1. A light modulating window comprising:

a pair of transparent substrates, transparent conductive films respectively disposed on the inner surfaces of said transparent substrates, and a containment means containing a liquid crystal material in gaps interposed between said transparent conductive films, wherein said containment means includes a latex, and wherein a difference between an extraordinary index ($n_e$) and an ordinary index ($n_o$) of said liquid crystal material is less than 0.23, and an average refractive index ($n_a$) of said liquid crystal material, a refractive index ($n_b$) of said containment means, a volume ratio (V) of said liquid crystal material to the total volume of said liquid crystal material and said containment means, an average diameter (D) of each of said gaps in terms of a true spherical body having the same volume and a distance (t) between said transparent conductive films satisfy the following equation, $$|n_a - n_b| \times (6 \times V/D) \times t \geq 4.2.$$

2. A window according to claim 1, wherein said average diameter is within a range from 0.5 to 3.0 μm.

3. A window according to claim 1, wherein said volume ratio is within a range from 0.5 to 0.9.

4. A window according to claim 1, wherein a distance between said transparent conductive films is within a range from 10 to 40 μm.

5. A window according to claim 1, wherein said liquid crystal material comprises a nematic liquid crystal.

6. A window according to claim 1, wherein said containment means is added with a surfactant.

7. A window according to claim 1, wherein said containment means is added with a cross-linking agent.

8. A window according to claim 1, wherein said transparent conductive film comprises an indium-tin oxide.

9. A light modulating window for use in architectural or automotive applications, consisting essentially of:

a pair of transparent substrates, transparent conductive films respectively disposed on the inner surfaces of said transparent substrates, and a containment means containing a liquid crystal material in gaps interposed between said transparent conductive films, wherein said containment means includes a latex, and wherein a difference between an extraordinary index ($n_e$) and an ordinary index ($n_o$) of said liquid crystal material is less than 0.23, and an average refractive index ($n_a$) of said liquid crystal material, a refractive index ($n_b$) of said containment means, a volume ratio (V) of said liquid crystal material to the total volume of said liquid crystal material and said containment means, an average diameter (D) of each of said gaps in terms of a true spherical body having the same volume and a distance (t) between said transparent conductive films satisfy the following equation, $$|n_a - n_b| \times (6 \times V/D) \times t \geq 4.2.$$

10. A window according to claim 1 or claim 9, wherein said average diameter is within a range from 0.5 to 3.0 μm; wherein said volume ratio is within a range from 0.5 to 0.9; wherein a distance between said transparent conductive films is within a range from 10 to 40 μm; wherein said liquid crystal material comprises a nematic liquid crystal; and wherein said transparent conductive film comprises an indium-tin oxide.

11. A window according to claim 10, wherein said containment means is added with a surfactant.

12. A window according to claim 10, wherein said containment means is added with a cross-linking agent.

13. A window according to claim 9, wherein said containment means is added with a surfactant.

14. A window according to claim 9, wherein said containment means is added with a cross-linking agent.

* * * * *

UNITED STATES PATENT AND TRADEMARK OFFICE
CERTIFICATE OF CORRECTION

PATENT NO. : 5,486,937
DATED : January 23, 1996
INVENTOR(S) : Yuichi YANO et al.

It is certified that error appears in the above-indentified patent and that said Letters Patent is hereby corrected as shown below:

At column 1, line 35, insert --a-- after the word "such".

At column 1, line 58, delete "60-502128" and insert --61-502128--.

At column 4, line 47, delete "form" and insert --from--.

At column 4, line 54, delete "Paten" and insert --Patent--.

At column 4, line 65, delete "crisis-linking" and insert --cross-linking--.

At column 7, line 10, delete "JAPAN" and insert --Japan--.

At column 7, line 19, delete the "." after the word "Polyvinyl".

At column 8, line 24, insert "1" after the word "Example".

Signed and Sealed this

Sixteenth Day of July, 1996

Attest:

BRUCE LEHMAN

Attesting Officer

Commissioner of Patents and Trademarks